United States Patent
Ohtsuka

(10) Patent No.: US 8,542,316 B2
(45) Date of Patent: Sep. 24, 2013

(54) ELECTRONIC DEVICE AND IMAGING APPARATUS WITH SOUND EMITTING DEVICE

(75) Inventor: Yoshio Ohtsuka, Osaka (JP)

(73) Assignee: Panasonic Corporation, Osaka (JP)

(*) Notice: Subject to any disclaimer, the term of this patent is extended or adjusted under 35 U.S.C. 154(b) by 249 days.

(21) Appl. No.: 12/765,147

(22) Filed: Apr. 22, 2010

(65) Prior Publication Data
US 2010/0271539 A1 Oct. 28, 2010

(30) Foreign Application Priority Data
Apr. 23, 2009 (JP) .................. 2009-104961

(51) Int. Cl.
*H04N 5/222* (2006.01)

(52) U.S. Cl.
USPC .............. 348/373; 379/433.02; 379/433.08; 379/433.11; 379/433.12; 379/433.13

(58) Field of Classification Search
USPC ..................................... 348/373; 379/433.02, 433.08, 433.11–433.13
See application file for complete search history.

(56) References Cited

U.S. PATENT DOCUMENTS

| | | | | |
|---|---|---|---|---|
| 5,909,490 | A * | 6/1999 | Sokolich et al. | 379/433.02 |
| 7,630,491 | B1 * | 12/2009 | Uyehara | 379/433.02 |
| 2003/0223610 | A1 * | 12/2003 | Tanemura et al. | 381/334 |

FOREIGN PATENT DOCUMENTS

| | | |
|---|---|---|
| JP | 2002-262393 | 9/2002 |
| JP | 2003-283896 | 10/2003 |
| JP | 2007-201736 | 8/2007 |
| JP | 2007-212642 | 8/2007 |
| JP | 2008-252576 | 10/2008 |

* cited by examiner

*Primary Examiner* — Antoinette Spinks
(74) *Attorney, Agent, or Firm* — Panasonic Patent Center

(57) ABSTRACT

An electronic device (e.g., an imaging apparatus) is implemented to obtain excellent sound effects while miniaturization and slimming down are achieved. An electronic device (e.g., an imaging apparatus) has a casing; a sound emitting device that has a sound emitting portion and is provided inside the casing; a movable member provided to the casing to have a gap between the movable member and the casing; and a communicating portion that communicates between the sound emitting portion of the sound emitting device and the movable member inside the casing.

8 Claims, 7 Drawing Sheets

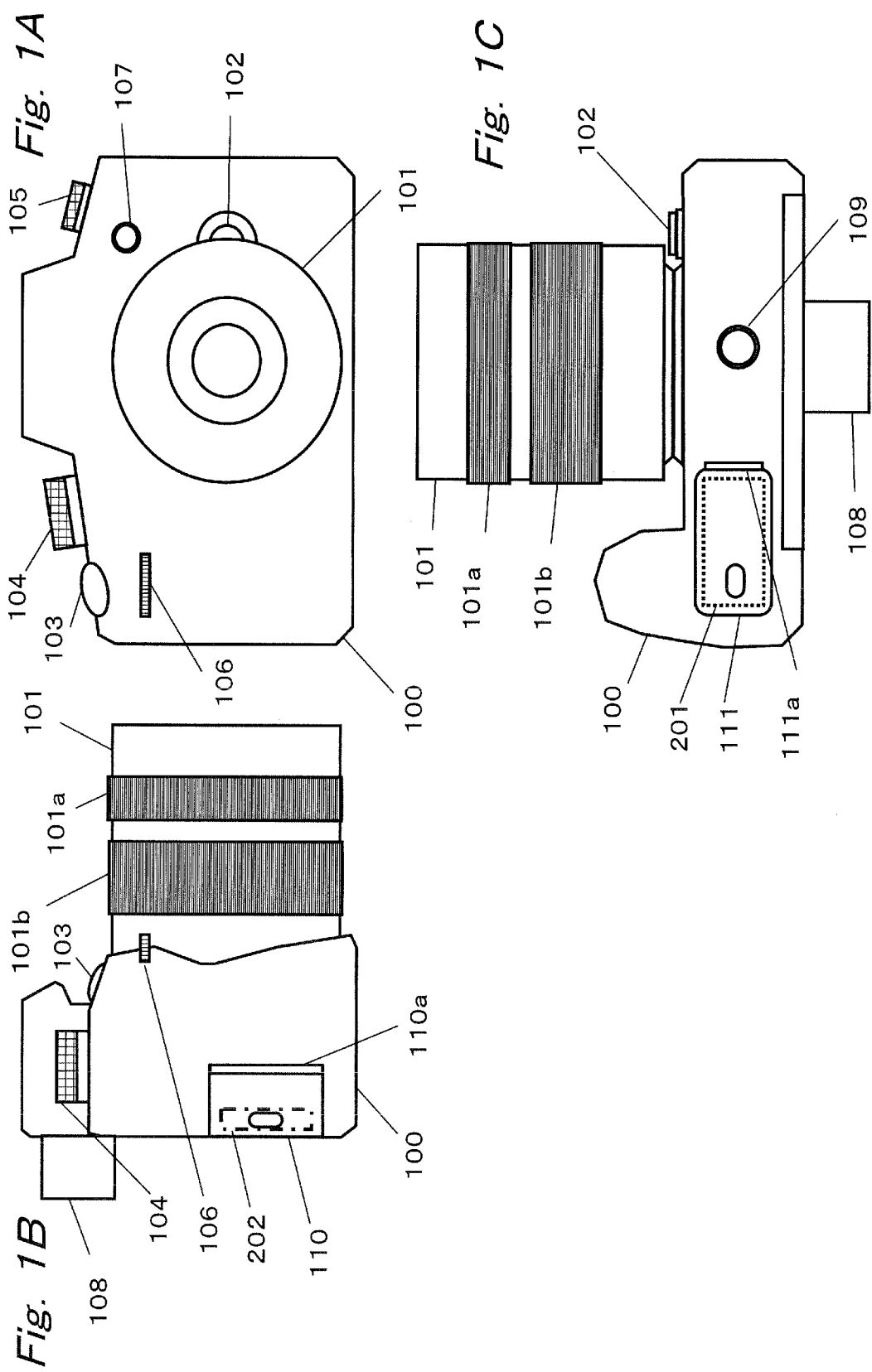

ELECTRONIC DEVICE AND IMAGING APPARATUS WITH SOUND EMITTING DEVICE

BACKGROUND

1. Technical Field

The technical field relates to an electronic device and an imaging apparatus that include a speaker capable of playing back and outputting sound.

2. Related Art

In recent years, it has become more common that digital cameras which are one type of electronic devices are added with a function of recording a subject as a moving image and a function of playing back the moving image. When a moving image is played back on a digital camera, video is displayed on a liquid crystal monitor mounted on the digital camera and sound is outputted from a speaker mounted on the digital camera.

JP-A-2003-283896 discloses an arrangement of a speaker in a digital camera. The digital camera disclosed in JP-A-2003-283896 has a multiple-hole portion provided in a casing, and a speaker is arranged on the inner side of the multiple-hole portion. Sound emitted from the speaker is outputted to the outside through the multiple-hole portion.

However, further miniaturization and slimming down of digital cameras have been pursued, and thus it is difficult to provide a multiple-hole portion in a casing. Accordingly, it is difficult to obtain excellent sound effects.

SUMMARY

In view of the above-described problem, an object is therefore to implement an electronic device that can obtain excellent sound effects while achieving miniaturization and slimming down.

An electronic device according to the first aspect includes a casing; a sound emitting device that has a sound emitting portion and is provided inside the casing; a movable member provided to the casing to have a gap between the movable member and the casing; and a communicating portion that communicates between the sound emitting portion of the sound emitting device and the movable member inside the casing.

An imaging apparatus according to the second aspect captures a subject to generate image data, and includes a casing; a sound emitting device having a sound emitting portion and provided inside the casing; a movable member provided to the casing to have a gap between the movable member and the casing; and a communicating portion that communicates between the sound emitting portion of the sound emitting device and the movable member inside the casing.

According to the first and second aspect, sound emitted from the sound emitting device is guided to the movable member through the communicating portion and is then outputted to the outside through a gap between the casing and the movable member. By guiding sound to outside the device through the communicating portion, an arrangement position of a speaker can be determined independent of position of holes for audio output which are provided in the casing. This increases a degree of flexibility in speaker arrangement, enabling to arrange the speaker at a desired location. Accordingly, the miniaturization and slimming down of the electronic device can be achieved. In addition, since sound is outputted through the gap between the casing and the movable member, excellent sound effects can be obtained without providing a multiple-hole portion for audio output in the casing.

BRIEF DESCRIPTION OF DRAWINGS

FIGS. 1A to 1C are views from three different directions (partially perspective) of a digital camera. FIG. 1A is a front view of the digital camera. FIG. 1B is a right side view of the digital camera. FIG. 1C is a bottom view of the digital camera.

FIG. 2A is a right side view of the digital camera, and FIG. 2B is a top view of the digital camera.

DETAILED DESCRIPTION OF PREFERRED EMBODIMENTS

Figure 2A:
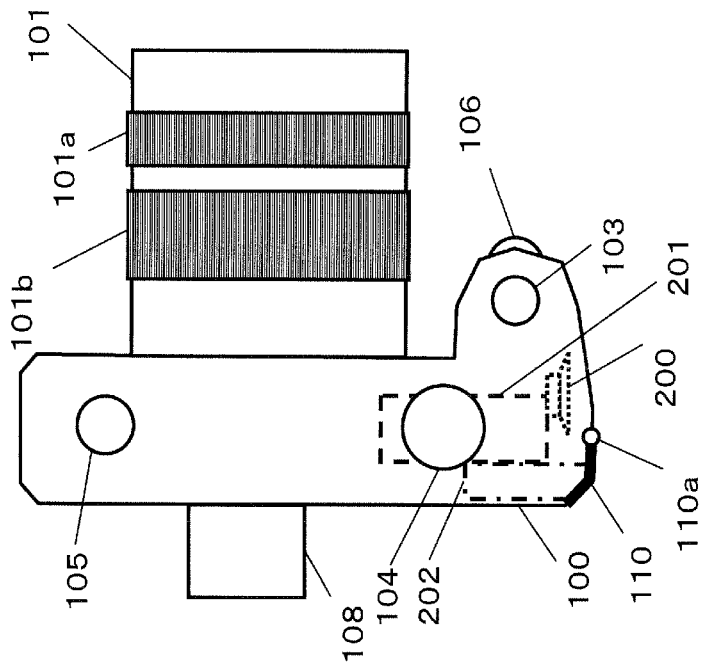
FIGS. 2A and 2B are perspective views of the main part of the digital camera related to audio output.

Embodiment
1. Configuration

FIGS. 1A to 1C are views from three different directions (partially perspective) of a digital camera as an example of an electronic device in the present embodiment. FIG. 1A is a front view of the digital camera. FIG. 1B is a right side view of the digital camera. The left and right in the digital camera indicate left and right when the digital camera is viewed from the back side. FIG. 1C is a bottom view of the digital camera. Note that although in the present embodiment the digital camera is shown as an example of an electronic device, any electronic device can be used as long as the electronic device includes at least a speaker capable of outputting sound. Thus, the electronic device may be, for example, a mobile phone terminal, a portable television receiver, or a portable game machine.

As shown in FIGS. 1A to 1C, the digital camera is covered by a casing 100. An interchangeable lens 101 that can capture outside light into the digital camera is arranged on the front side of the digital camera. The interchangeable lens 101 is mainly configured by lenses and a lens barrel, and can guide light to an imaging device arranged in the digital camera. A zoom ring 101*a* and a focus ring 101*b* are arranged on the interchangeable lens 101. In this interchangeable lens 101, the focal length of the interchangeable lens 101 can be changed by an operation of turning the zoom ring 101*a*. Focusing on a subject can be performed by an operation of turning the focus ring 101*b*. From the digital camera, the interchangeable lens 101 can be detached by an operation of pressing a lens detachment button 102. The digital camera can be used with various interchangeable lenses.

A shutter button 103, a mode dial 104, and a focus mode dial 105 are arranged on the top of the digital camera. In this digital camera, an image which is captured by the imaging device can be recorded in the digital camera by an operation of pressing the shutter button 103. An operating mode that the user desires can be selected from various operating modes such as a still image recording mode, a moving image recording mode, and a playback mode, by an operation of turning the mode dial 104. It can be selected. whether to focus on a subject automatically or manually by an operation of turning the focus mode dial 105.

A front dial 106 that allows a user to select and determine various setting items is arranged on the right of the front side of the digital camera. An AF assist light lamp 107 that assists in focusing on a subject in a dark place is arranged on the left of the front side of the digital camera. A finder 108 that allows a user to visually recognize a subject is arranged on the back side of the digital camera. A tripod mounting hole 109 used to fix the digital camera on a tripod is arranged on the bottom side of the digital camera.

A memory card storage 202 that can store a memory card is arranged on the right side of the digital camera. The memory card storage 202 is covered by a card door 110. The card door 110 is arranged to close an opening portion that has substantially the same shape as the card door 110 and is provided in the casing 100 (the opening portion has substantially the same shape as the card door 110 and thus overlaps the card door 110 at an edge in the drawing. The opening portion is not denoted by any reference sign.). The card door 110 can be opened forward in the drawing sheet about a card door shaft 110a. In a state in which the card door 110 covers the memory card storage 202, there is a slight gap between the card door 110 and the casing 100 (an end edge of the opening portion for the card door 110). The gap is very small and thus is not shown in the figures.

A battery storage 201 that can store a battery is arranged on the bottom of the digital camera. The battery storage 201 is covered by a battery door 111. The battery door 111 is arranged to close an opening portion that has substantially the same shape as the battery door 111 and is provided in the casing 100 (the opening portion has substantially the same shape as the battery door 111 and thus overlaps the battery door 111 at an edge in the drawing. The opening portion is not denoted by any reference sign). The battery door 111 can be opened forward in the drawing sheet about a battery door shaft 111a. In a state in which the battery door 111 covers the battery storage 201, there is a slight gap between the battery door 111 and the casing 100 (an end edge of the opening portion for the battery door 111). The gap is very small and thus is not shown in the figures.

2. Operations of the Digital Camera

Next, exemplary operations of the digital camera performed by a user will be described. First, the user turns on power to the digital camera. A power switch is provided on the top of the digital camera but is not shown. The user selects either the still image recording mode or the moving image recording mode by turning the mode dial 104. The user selects whether to focus on a subject automatically or manually by turning the focus mode dial 105.

The user determines an angle of view by turning the zoom ring 101a of the interchangeable lens 101 while viewing the subject through the finder 108. The user performs a pressing operation on the shutter button 103. Here, when the still image recording mode is selected by the mode dial 104, by performing a single pressing operation on the shutter button 103, a captured still image is recorded in a memory card stored in the memory card storage 202. When the moving image recording mode is selected with the mode dial 104, moving image recording starts by a first pressing operation by the user on the shutter button 103, and the moving image recording ends by a second pressing operation by the user on the shutter button 103. The moving image is recorded in the memory card stored in the memory card storage 202.

The user selects the playback mode by turning the mode dial 104. The user selects a still image or moving image to be played back, by turning the front dial 106. The user plays back the selected still image or moving image, by pressing the front dial 106. During playback of a still image or moving image with sound, the sound is played back from a speaker arranged inside the casing 100.

3. Configuration of the Main Part of the Digital Camera Related to Audio Output

Figure 2B:
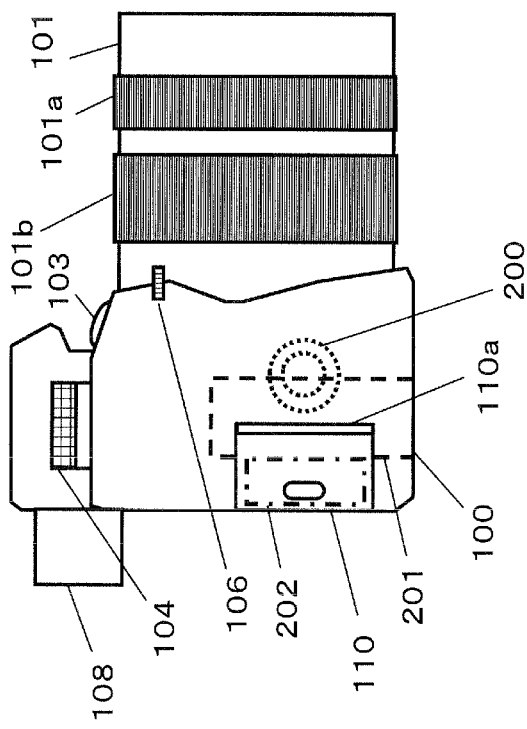

FIGS. 2A and 2B are perspective views of the main part of the digital camera related to audio output. FIG. 2A is a perspective view of the main part on the right side of the digital camera, and FIG. 2B is a perspective view of the main part on the top of the digital camera. As shown in FIGS. 2A and 2B, a speaker 200 indicated by a dotted line is arranged adjacent to the battery storage 201 indicated by a dashed line. The memory card storage 202 indicated by a dash-dotted line is arranged adjacent to the battery storage 201 indicated by the dashed line.

Figure 3:
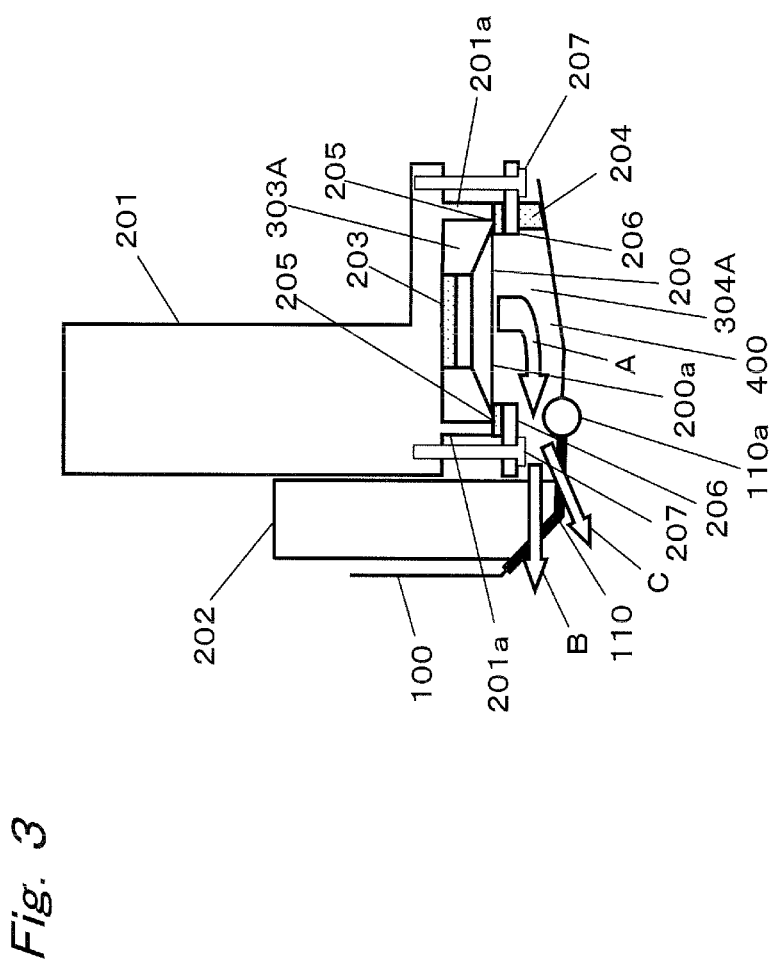
FIG. 3 is a detailed diagram of a speaker and surroundings thereof.

FIG. 3 is a detailed diagram of the speaker 200 and surroundings thereof in FIG. 2B. In FIG. 3, taking into consideration the visibility of the drawing, those members arranged inside the casing 100, such as the speaker 200, are also indicated by solid lines.

The speaker 200 is secured to a speaker securing frame 201a which is integrally formed with the battery storage 201, with screws 207 via a sheet metal 206 that has an inner sealing 205. The screws 207 are used to attach the sheet metal 206 to the battery storage 201. The speaker 200 abuts on the battery storage 201 via a cushion 203. By thus inserting the cushion 203 between the speaker 200 and the battery storage 201, even if there is a forming size error in the speaker securing frame 201a, the speaker 200 can be easily brought into intimate contact with the speaker securing frame 201a and the inner sealing 205 can be easily brought into intimate contact with the speaker securing frame 201a. A sound emitting portion 200a of the speaker 200 is oriented in a direction opposite to the battery storage 201.

Figure 4:
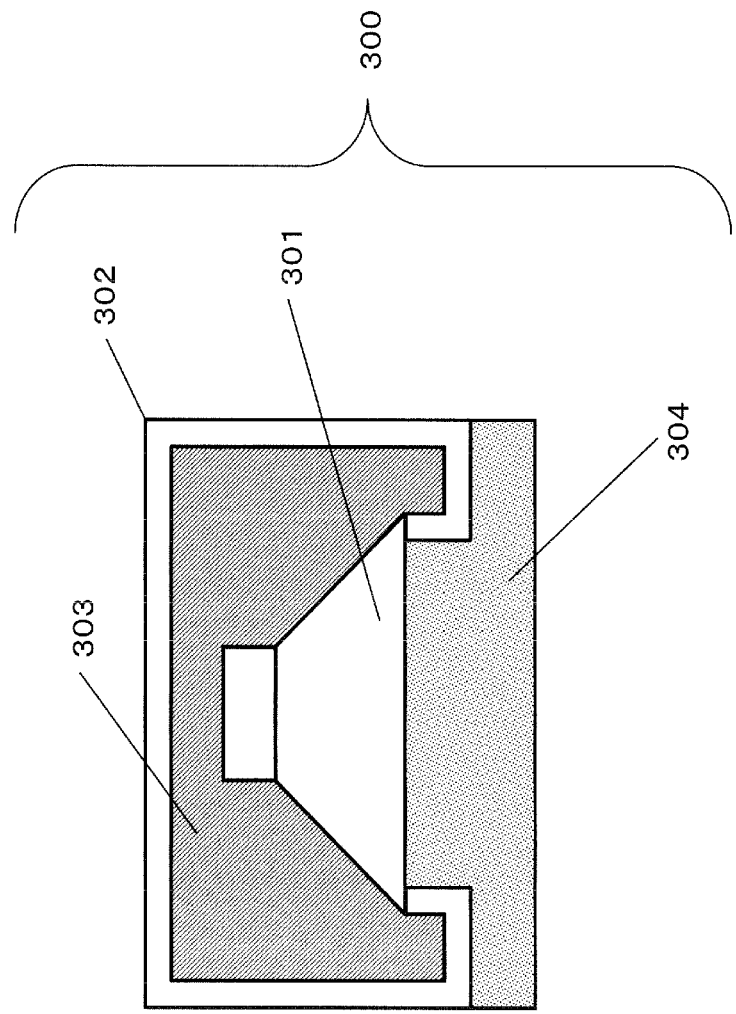
FIG. 4 is a configuration diagram of a general speaker apparatus.

FIG. 4 is a configuration diagram of a general speaker apparatus. A speaker apparatus 300 includes a speaker 301, and a casing 302 that contains the speaker 301 and isolates a back air chamber 303 from a front air chamber 304.

Sound of the speaker 301 is observed on the side of the front air chamber 304. Sound is an air wave that has sparse condition and dense condition in the atmosphere. When the speaker 301 operates, the relationship between the pressure fluctuation in the back air chamber 303 and the pressure fluctuation in the front air chamber 304 is of opposite phase. If the pressure fluctuation in the back air chamber 303 is sparse and the pressure fluctuation in the front air chamber 304 is dense, when sufficient isolation is not provided between the back air chamber 303 and the front air chamber 304, the pressure fluctuation in the front air chamber 304 is canceled out by the pressure fluctuation in the back air chamber 303, thus decreasing. Namely, when there is no isolation between the back air chamber 303 and the front air chamber 304, sound outputted from the speaker 301 decreases.

In view of this, in the present embodiment, as described above, the speaker 200 is secured to the speaker securing frame 201a which is integrally formed with the battery storage 201, with the screws 207 via the sheet metal 206 with the inner sealing 205. In such a secured state, the inner sealing 205 is sandwiched between the speaker 200 and the sheet metal 206. Then, isolation is securely provided between a back air chamber 303A on the back side of the speaker 200 and a front air chamber 304A on the front side of the speaker 200 by the speaker securing frame 201a and the battery storage 201, which correspond to the casing 302 in FIG. 4, as well as by the inner sealing 205. Therefore, sound outputted from the speaker 200 is prevented from decreasing.

In addition, in the present embodiment, an outer sealing 204 is inserted between the casing 100 and the sheet metal 206. The outer sealing 204 is arranged on an end side of the speaker 200 on the opposite side of the memory card storage 202, and serves to fill (hermetically seal) a gap between the sheet metal 206 and the casing 100 to prevent sound from propagating in a direction opposite to the memory card storage 202 in the casing 100.

By such a configuration, as shown by a path indicated by arrows A and B or a path indicated by arrows A and C in FIG. 3, sound outputted from the speaker 200 is guided through the interior space of the casing 100 by an inner surface of the casing 100, the outer sealing 204, the inner sealing 205, and the like, and proceeds to the inner side of the card door 110. The sound further passes through the gap between the card door 110 and the casing 100 and is then emitted outside the casing 100.

As described above, a communicating portion 400 that guides sound outputted from the speaker 200 to the inner side of the card door 110 is formed in the casing 100. In this case, the communicating portion 400 is hermetically sealed by the outer sealing 204 and the inner sealing 205. By this configuration, sound leakage from the communicating portion 400 to the outside is favorably prevented.

Although it is desirable that, as described above, the gap between the speaker securing frame 201a and the casing 100 is covered with the outer sealing 204 to prevent sound from propagating in the direction opposite to the memory card storage 202 in the casing 100, the gap may be covered with a different member other than the outer sealing 204 as long as a communicating portion that communicates between the sound emitting portion 200a of the speaker 200 and the card door 110 can be formed.

Figure 5:
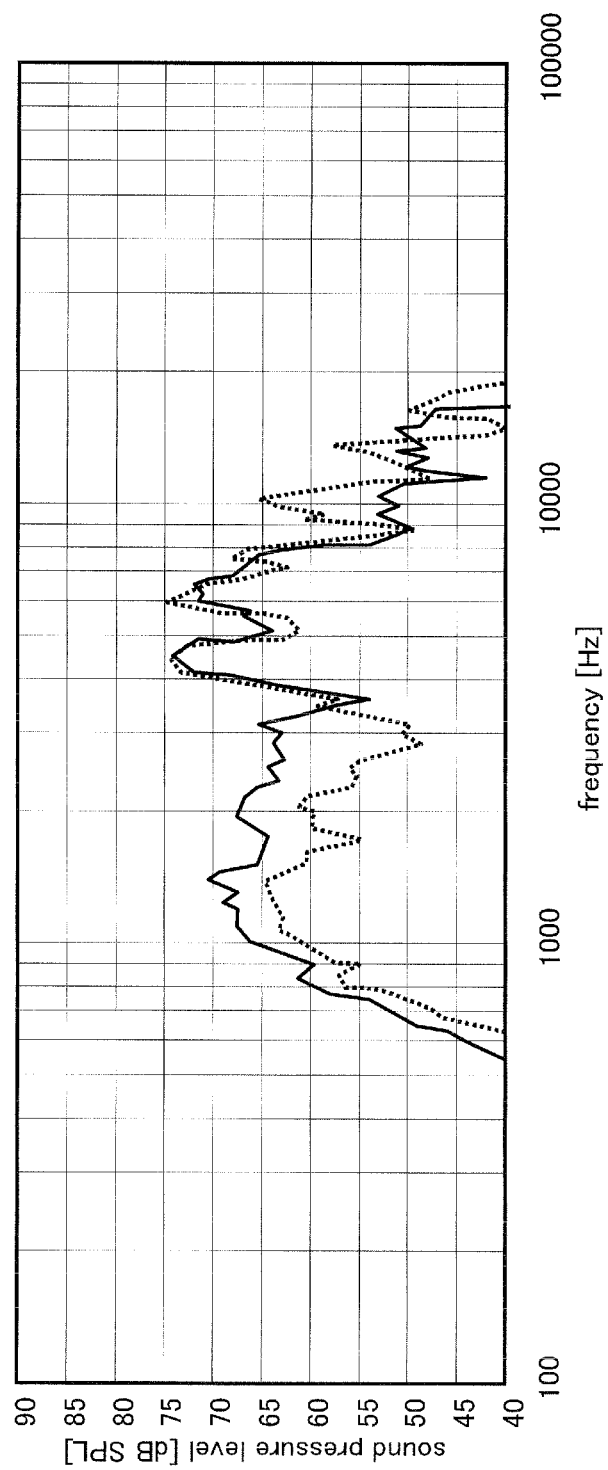
FIG. 5 is a first graph showing frequency characteristics of sound emitted outside a casing.

FIG. 5 is a graph showing frequency characteristics of sound emitted outside the casing 100. A horizontal axis represents frequency and a vertical axis represents sound pressure level. A dotted line indicates a case in which the outer sealing 204 is not provided, and a solid line indicates a case in which the outer sealing 204 is provided. It can be seen from the graph that, when the outer sealing 204 is provided, the sound pressure level is significantly improved in a range from about 550 Hz to about 3.7 kHz.

Figure 6:
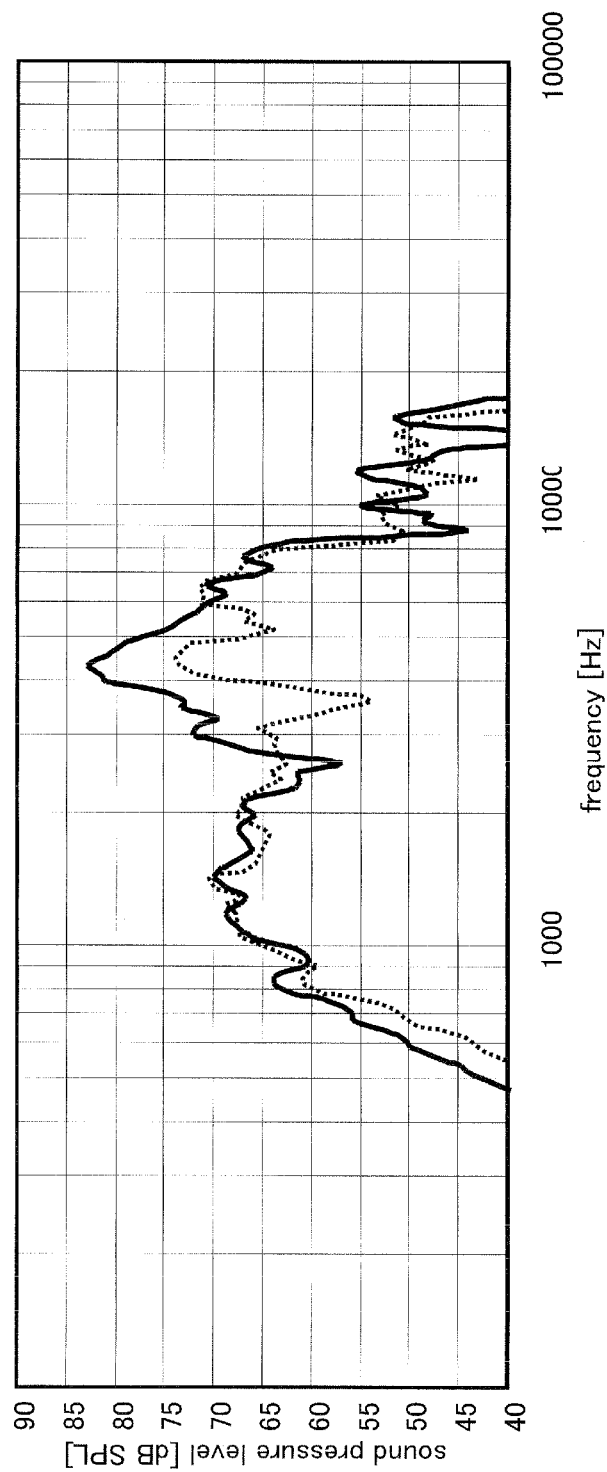
FIG. 6 is a second graph showing frequency characteristics of sound emitted outside the casing.

FIG. 6 is a graph showing frequency characteristics of sound outputted outside the casing 100. A horizontal axis represents frequency and a vertical axis represents sound pressure level. A dotted line indicates a case in which the inner sealing 205 is not provided, and a solid line indicates a case in which the inner sealing 205 is provided. It can be seen from the graph that, when the inner sealing 205 is provided, the sound pressure level is significantly improved by about 5 dB in a range of about 900 Hz or less and by about 10 dB in a range from about 1.5 kHz to about 5 kHz.

According to the digital camera of the present embodiment, sound emitted from the speaker 200 is guided to the card door 110 through the communicating portion 400 and is then outputted to the outside through the gap between the casing 100 and the card door 110 (movable member) and the like. By thus guiding sound to outside the digital camera through the communicating portion 400, the arrangement position of the speaker can be determined independent of the position of holes for audio output which are provided in the casing. This increases degree of flexibility in speaker arrangement, enabling to arrange the speaker at a desired location. Accordingly, miniaturization and slimming down of the digital camera can be achieved. In addition, since sound is outputted through the gap between the casing 100 and the card door 110 and the like, excellent sound effects can be obtained without providing a multiple-hole portion for audio output.

4. Other Embodiments

Although, in the present embodiment, sound is emitted outside the casing 100 through the gap between the casing 100 and the card door 110 which covers the memory card storage 202, the configuration is not limited thereto. For example, sound may be emitted outside the casing 100 through the gap between the battery door 111 which covers the battery storage 201 and the casing 100. In such a case, a communicating portion that communicates between the sound emitting portion 200a of the speaker 200 and the battery door 111 may be provided. Furthermore, sound may be emitted outside the casing 100 through both the gap between the card door 110 and the casing 100 and the gap between the battery door 111 and the casing 100.

Figure 7:
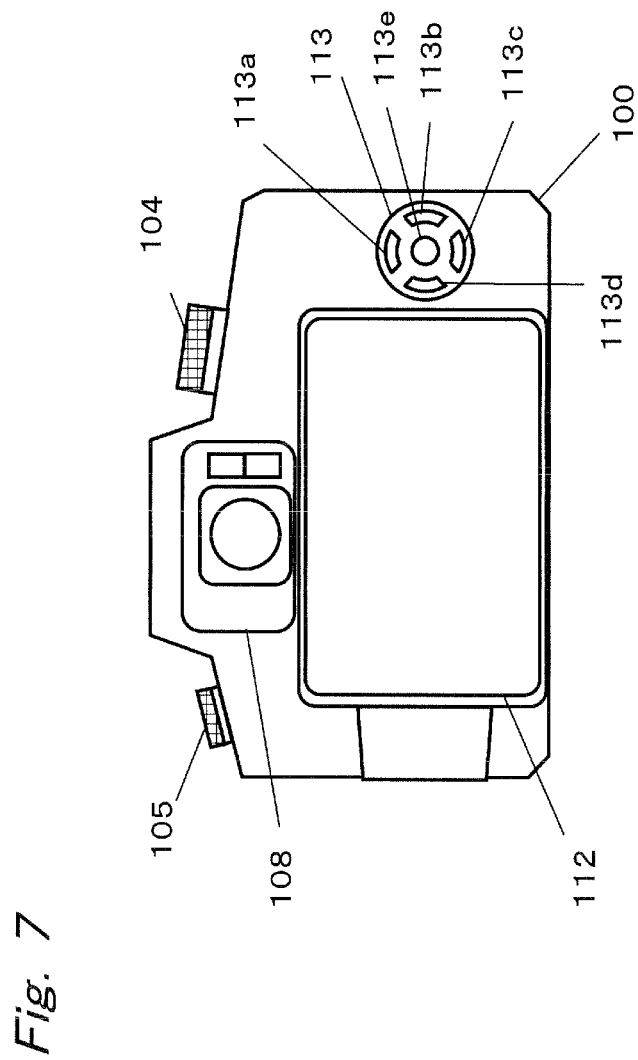
FIG. 7 is a rear view of the digital camera.

Alternatively, sound may be emitted outside the casing 100 through gaps between operating switches and the casing 100. An exemplary configuration of this case will be described below with reference to FIG. 7. FIG. 7 is a rear view of the digital camera. A liquid crystal monitor 112 and cursor buttons 113 are arranged on the back side of the digital camera.

When the playback mode is selected, a still image or moving image, which is selected by user's operation of turning the front dial 106 (see FIG. 1A) and is determined by user's operation of pressing operation on the front, dial 106, is played back and displayed on the liquid crystal monitor 112.

The cursor buttons 113 include an up button 113a, a right button 113b, a down button 113c, a left button 113d, and a menu set button 113e. Similarly to the front dial 106, various setting items can be selected and determined by performing a pressing operation on the cursor buttons 113. Each of the up button 113a, the right button 113b, the down button 113c, the left button 113d, and the menu set button 113e is provided in an opening portion that has substantially the same shape as the button and that is formed in the surface of the casing 100 for each of the buttons. Each of the buttons is arranged such that a tip thereof protrudes from the surface of the casing 100. There is a very small gap between each cursor button 113 and a corresponding opening (an end edge of the opening) formed in the casing 100 so that the cursor button 113 can be stroked smoothly (the gap is very small and thus is not shown). Sound is emitted outside the casing 100 through these very small gaps.

In the configuration in which sound is emitted outside the casing 100 through the gaps between the cursor buttons 113 and the casing 100, the liquid crystal monitor 112 playing back and displaying a still image or moving image and the gaps between the cursor buttons 113 and the casing 100 through which sound is emitted outside the casing 100, are present close to each other and in the same plane. Therefore the user can perform natural viewing and listening. In addition, since the plurality of cursor buttons 113 is present, there is obtained the same effect as that obtained in the case where a multiple-hole portion is provided in the surface of the casing 100. Note that although in this case the cursor buttons 113 as an example of push switches are shown, the operating switches may be alternatively slide switches.

Furthermore, sound may be emitted outside the casing 100 through a gap between a terminal door which covers an external connection terminal and the casing 100. This configuration is the same as that of the case in which sound is emitted outside the casing 100 through the gap between the card door 110 and the casing 100 and thus is not shown. In the digital camera, for example, an HDMI terminal and a digital out terminal are arranged. When these terminals are not used, the terminals are covered by a terminal door for the terminals. By connecting the HDMI terminal of the digital camera to an HDMI terminal of a television set provided with an HDMI terminal via an HDMI cable, the user can enjoy images with high image quality on the television set. By connecting the digital out terminal of the digital camera to a USB terminal of a personal computer via a USB cable, images in the digital camera can be obtained in the personal computer.

Note that a multiple-hole portion may be provided in the card door 110, the battery door 111, or the terminal door, if strength thereof can be ensured.

In the above-described embodiment, the speaker 200 is an example of a sound emitting device. The card door 110, the battery door 111, and the cursor buttons 113 are examples of a movable member. The inner sealing 205 is an example of a first sealing member. The outer sealing 204 is an example of a second sealing member. The sheet metal 206 is an example of a securing member. The battery storage 201 and the memory card storage 202 are examples of a storage portion.

As described above, even if any space for forming a multiple-hole portion cannot be secured due to the miniaturization and slimming down of the digital camera, by emitting sound outside the casing 100 through the gap(s) between the casing 100 and the movable member (s), excellent sound effects can be obtained.

Industrial Applicability

According to the embodiment, excellent sound effects can be obtained while miniaturization and slimming down are achieved. Therefore, the embodiment can be applied to various electronic devices that include a speaker capable of outputting sound, such as digital cameras, mobile phone terminals, portable television receivers, and portable game machines.

What is claimed is:

1. An electronic device comprising:
   a casing;
   a sound emitting device that has a sound emitting portion and is provided inside the casing;
   a movable member provided to the casing to have a gap between the movable member and the casing; and
   a communicating portion provided inside the casing that communicates between the sound emitting portion of the sound emitting device and the gap between the movable member and the casing, wherein:
   the gap communicates between the communicating portion and an outside of the casing; and
   a sound emitted from the sound emitting portion is outputted to the outside of the casing through the gap between the movable member and the casing via the communicating portion.

2. The electronic device according to claim 1, further comprising a storage portion, wherein
   the movable member is an openable lid that covers the storage portion.

3. The electronic device according to claim 2, wherein the storage portion stores at least one of a battery or a storage medium.

4. The electronic device according to claim 1, further comprising an external connection terminal, wherein
   the movable member is an openable lid that covers the external connection terminal.

5. The electronic device according to claim 1, wherein the movable member is an operating switch.

6. The electronic device according to claim 1, further comprising:
   a securing member that is arranged on an audio output side of the sound emitting device to secure the sound emitting device; and
   a first sealing member that is sandwiched between the sound emitting device and the securing member to hermetically seal the communicating portion.

7. The electronic device according to claim 6, further comprising a second sealing member that is arranged between the securing member and the casing to hermetically seal the communicating portion.

8. An imaging apparatus for capturing a subject to generate image data, comprising:
   a casing;
   a sound emitting device having a sound emitting portion and being provided inside the casing;
   a movable member provided to the casing to have a gap between the movable member and the casing; and
   a communicating portion provided inside the casing that communicates between the sound emitting portion of the sound emitting device and the gap between the movable member and the casing, wherein:
   the gap communicates between the communicating portion and an outside of the casing; and
   a sound emitted from the sound emitting portion is outputted to the outside of the casing through the gap between the movable member and the casing via the communicating portion.

* * * * *